(12) United States Patent
Maji et al.

(10) Patent No.: US 8,924,612 B2
(45) Date of Patent: Dec. 30, 2014

(54) APPARATUS AND METHOD FOR PROVIDING A BIDIRECTIONAL COMMUNICATIONS LINK BETWEEN A MASTER DEVICE AND A SLAVE DEVICE

(75) Inventors: Partha Prasun Maji, Sheffield (GB); Steven Richard Mellor, Sheffield (GB)

(73) Assignee: ARM Limited, Cambridge (GB)

( * ) Notice: Subject to any disclaimer, the term of this patent is extended or adjusted under 35 U.S.C. 154(b) by 451 days.

(21) Appl. No.: 13/439,171

(22) Filed: Apr. 4, 2012

(65) Prior Publication Data
US 2013/0268705 A1      Oct. 10, 2013

(51) Int. Cl.
G06F 13/00      (2006.01)
G06F 13/364      (2006.01)

(52) U.S. Cl.
CPC .................................. *G06F 13/364* (2013.01)
USPC ........................................... 710/110; 710/310

(58) Field of Classification Search
USPC ..................... 710/104–110, 305–310, 52–57; 713/300–340
See application file for complete search history.

(56) References Cited

U.S. PATENT DOCUMENTS

| 4,475,192 A * | 10/1984 | Fernow et al. ................. | 370/232 |
| 2005/0063308 A1* | 3/2005 | Wise et al. .................... | 370/236 |
| 2005/0177722 A1* | 8/2005 | Vaarala et al. ................. | 713/168 |
| 2008/0307147 A1* | 12/2008 | Biran et al. ................... | 710/310 |
| 2009/0049212 A1* | 2/2009 | Mangano et al. ............... | 710/61 |
| 2010/0306426 A1* | 12/2010 | Boonstra et al. ............... | 710/57 |
| 2012/0331321 A1* | 12/2012 | Kaburlasos et al. .......... | 713/323 |

OTHER PUBLICATIONS

Kim et al., "FlexiBuffer: Reducing Leakage Power in On-Chip Network Routers", *Dept. of Electronic and Electrical Engineering*, No Date, pp. 936-941.
Arteris, "Network-on-Chip—The future of SoC power management", Jun. 2006, 16 pages.
Matsutani et al., "Ultra Fine-Grained Run-Time Power Gating of On-Chip Routers for CMPs", No Date, 8 pages.

* cited by examiner

*Primary Examiner* — Raymond Phan
(74) *Attorney, Agent, or Firm* — Nixon & Vanderhye P.C.

(57) ABSTRACT

A bidirectional communications link between a master device and a slave device includes first endpoint circuitry coupled to the master device generating forward data packets, second endpoint circuitry coupled to the slave device for receiving reverse data packets, and bidirectional communication circuitry for transferring forward data packets from the first endpoint circuitry to the second endpoint circuitry and reverse data packets from the second endpoint circuitry to the first endpoint circuitry. In response to a power down condition requiring a power down of at least one of the first endpoint circuitry and the second endpoint circuitry, performance of said power down is deferred until both said outstanding forward credit signal and said outstanding reverse credit signal have been de-asserted.

20 Claims, 8 Drawing Sheets

APPARATUS AND METHOD FOR PROVIDING A BIDIRECTIONAL COMMUNICATIONS LINK BETWEEN A MASTER DEVICE AND A SLAVE DEVICE

BACKGROUND OF THE INVENTION

1. Field of the Invention

The present invention relates to an apparatus and method for providing a bidirectional communications link between a master device and a slave device, and in particular to a mechanism for ensuring correct operation of the bidirectional communications link when subjected to a sequence of power down and power up operations.

2. Description of the Prior Art

It is known to design system-on-chip (SoC) integrated circuits by connecting together a plurality of functional circuit blocks using interconnect circuitry. As an example, the functional circuit blocks may include a processor core, a graphics processing unit, a memory controller, input/output interface circuitry etc. The interconnect circuitry may have the form of a wide parallel signal connection in which a plurality of multi-bit channels are provided passing in each direction. An example of such an interconnect architecture is the AXI interconnect architecture designed by ARM Limited of Cambridge, England. A problem with this approach as system-on-chip integrated circuits increase in complexity and size is that the parallel interconnect circuitry may include a disadvantageously large number of signal lines which can require routing over long distances within the system-on-chip integrated circuit thereby consuming a disadvantageous amount of circuit area and resource.

In order to address the above problem of routing wide parallel interconnect circuitry over relatively large distances within a SoC integrated circuit, it has been proposed to convert the parallel signals at the source into a plurality of data packets which can then be serially transmitted over a narrower interconnect. As an example, a full parallel interface of over 100 signal lines may be broken down into a plurality of narrower multi-bit data packets which are each transferred in turn in a time-division-multiplexed fashion over a narrower interconnect before being reassembled at the packet receiver into the full width parallel interface signals and applied to the destination circuitry. Such a form of narrower interconnect will also be referred to herein as a thin link interconnect.

It is known within some systems that the data source and the data destination may be operating in different clock domains. For example, a system-on-chip integrated circuit may include multiple clock domains using clocks of different frequencies. Some of the frequencies may vary depending upon the performance requirements of the circuitry within that domain at a particular point in time e.g. a processor core may have its clock frequency varied depending upon the processing workload it currently faces with a lower clock frequency being used when the workload is low in order to reduce power consumption. The clocks used to control the circuitry within different clock domains may be asynchronous from one another, and hence first-in-first-out buffers may be provided within the thin link interconnect when passing signals between asynchronous clock domains, the signals being captured into the buffers for resynchronising with the clock signal of the destination clock domain.

One way of managing transmission of signals which are received into buffers is to use a credit-based mechanism where the packet transmitter gates transmission of packets to the packet receiver based on credit information that it receives from the packet receiver indicative of available space within the buffers. For example a token signal may be used to indicate to the packet transmitter whether or not there is storage capacity within an associated first-in-first-out buffer. This token can be used as part of a flow control system that provides "back pressure" between the packet transmitter and the packet receiver so as to gate the packet transmitter from sending more data packets when there is insufficient storage capacity within a receiving first-in-first-out buffer to store those data packets for resynchronisation across the asynchronous clock boundary.

In some implementations, it will be necessary for the thin link interconnect to provide for bidirectional communication of data packets. Hence, when using the above-described credit-based mechanism, there will not only be data passing in both directions through the thin link interconnect, but there will also be credit signals passing in both directions.

Many modern SoC integrated circuits employ multiple power domains, allowing parts of the SoC to be powered down when not in use, in order to reduce power consumption. The presentation slides entitled "Network-on-Chip: the Future of SoC Power Management" produced by Arteris, and available on the Internet at the web address http://www.cdnusers.org/community/encounter/Resources/resources_design/overview/Dtp_cdnliveemea2006_arterisNOC.pdf, describes on slide 15 the possibility of powering down a power domain including a portion of an interconnect structure, indicating that the domain must be idle before power down is performed.

The paper "FlexiBuffer: Reducing Leakage Power in On-Chip Network Routers", by G. Kim, J. Kim, and S. Yoo, DAC 2011, 5 to 10 Jun. 2011, San Diego, Calif., USA, explains how credit flow latency can affect system performance, and illustrates how power consumption can be reduced by sending an early credit. Further, the paper "Ultra Fine-Grained Run-Time Power Gating of On-Chip Routers for CMPs", by F L Matsutani, et al., NOCS 2010, provides an overview on how power gating can be applied on a SOC, and also explains the importance of early wake up latency.

When the above described thin link interconnect structure is employed within a SoC employing multiple power domains, in addition to issues of wake up latency, a problem that arises is how to ensure correct operation of the thin link interconnect structure when either end of the thin link interconnect is subjected to power down and power up operations.

SUMMARY OF THE INVENTION

Viewed from a first aspect the present invention provides an apparatus for providing a bidirectional communications link between a master device and a slave device, comprising: first endpoint circuitry configured to be coupled to the master device; second endpoint circuitry configured to be coupled to the slave device; bidirectional communication circuitry coupled to said first endpoint circuitry and said second endpoint circuitry and configured to transfer forward data packets from the first endpoint circuitry to the second endpoint circuitry and to transfer reverse data packets from the second endpoint circuitry to the first endpoint circuitry; the first endpoint circuitry comprising a forward packet transmitter configured to generate said forward data packets and a reverse packet receiver configured to receive said reverse data packets into a reverse packet buffer circuit; the second endpoint circuitry comprising a reverse packet transmitter configured to generate said reverse data packets and a forward packet receiver configured to receive said forward data packets into a forward packet buffer circuit; the first endpoint circuitry further comprising forward credit use circuitry configured to gate transmission of forward data packets from the forward packet transmitter to the forward packet receiver in dependence on forward credit information issued from the forward packet receiver over said bidirectional communication circuitry in response to forward data packets being removed from said forward packet buffer circuit, the first endpoint circuitry further comprising forward credit checking circuitry configured to monitor a status of the forward credit use circuitry and to assert an outstanding forward credit signal if said status indicates that some forward credit information is outstanding from the forward packet receiver; and the second endpoint circuitry further comprising reverse credit use circuitry configured to gate transmission of reverse data packets from the reverse packet transmitter to the reverse packet receiver in dependence on reverse credit information issued from the reverse packet receiver over said bidirectional communication circuitry in response to reverse data packets being removed from said reverse packet buffer circuit, the second endpoint circuitry further comprising reverse credit checking circuitry configured to monitor a status of the reverse credit use circuitry and to assert an outstanding reverse credit signal if said status indicates that some reverse credit information is outstanding from the reverse packet receiver; wherein in response to a power down condition requiring a power down of at least one of the first endpoint circuitry and the second endpoint circuitry, performance of said power down is deferred until both said outstanding forward credit signal and said outstanding reverse credit signal have been de-asserted.

The inventors of the present invention realised that a potential deadlock situation can arise when employing credit-based flow control mechanisms to control transmission of data packets over a bidirectional communications link. In particular, if a decision to power down either or both of the first endpoint circuitry and the second endpoint circuitry is taken purely having regard to a check that transfer of outstanding data packets has been completed, it is possible that credit information will be in the process of being transferred over the bidirectional communication circuitry between the first endpoint circuitry and the second endpoint circuitry (i.e. "on-the-fly") at the time that the power down is performed. In such a scenario, such credit information that is on-the-fly will be lost. Often the bidirectional communication circuitry is constructed such that signals take multiple clock cycles to pass from one end to the other, hence increasing the likelihood of such credit information being in flight at the time the power down takes place.

Following a subsequent power up, the packet transmitter affected by the lost credit information will run low on credit, hence adversely affecting performance by causing that packet transmitter in some instances to defer transferring a data packet when in fact the receiving buffer circuit would have had space to receive that packet. After several power down and power up cycles, it is possible that a packet transmitter will run out of sufficient credit to send data packets, at which point a deadlock situation will arise.

In accordance with the present invention, this problem is addressed through the provision of forward credit checking circuitry in the first endpoint circuitry and reverse credit checking circuitry in the second endpoint circuitry. These credit checking circuits monitor the status of associated credit use circuitry in the first and second endpoint circuitry and assert outstanding credit signals if that status indicates that receipt of some credit information is outstanding from the relevant packet receiver. Power down of either or both of the first and second endpoint circuitry is prevented whilst an outstanding credit signal is being asserted by either credit checking circuitry.

By such an approach it can be ensured that no credit information is on the fly between the two endpoint circuits at the time power down is performed, hence avoiding the potential performance and deadlock problems that could otherwise arise.

In addition the present invention also alleviates the problem of wake up latency, since all of the credit information accumulates back at the associated packet transmitter side of the bidirectional communication circuitry before the power down takes place. Accordingly, as soon as power up subsequently takes place, each packet transmitter has its full complement of credit, and can accordingly begin transmitting data packets without delay.

Whilst both endpoint circuits may reside in the same power domain, and hence both be powered down at the same time, in one embodiment the first endpoint circuitry resides in a first power domain, the second endpoint circuitry resides in a second power domain, and the power control condition requires a power down of one of said first and second power domains.

The present techniques are applicable to data packet transmission in general, and hence the techniques could be used outside the field of integrated circuit interconnect signals. However, the present techniques are particularly well suited to embodiments in which the packet transmitters are coupled to integrated circuit interconnect parallel interfaces and are configured to convert parallel signals received from that integrated circuit interconnect parallel interface to data packets for transmission via the bidirectional communication circuitry.

Similarly, the packet receivers may be coupled to the associated integrated circuit interconnect parallel interfaces and configured to convert data packets received from said bidirectional communication circuitry to parallel signals for transmission to the associated integrated circuit interconnect parallel interface.

The bidirectional communication circuitry could transmit the data packets as an intra-IC communication within a single integrated circuit or alternatively, in some embodiments, as an inter-IC communication between different integrated circuits disposed within separate integrated circuit packages. Different integrated circuits may be connected via a printed circuit board.

In one embodiment the master device is configured to initiate transactions, each transaction requiring a plurality of data transfers to take place between the master device and the slave device, including at least one forward data transfer from the master device to the slave device and at least one reverse data transfer from the slave device to the master device. In such an embodiment, the forward packet transmitter may be arranged to convert each forward data transfer into one or more forward data packets, and the reverse packet transmitter may be arranged to convert each reverse data transfer into one or more reverse data packets, and the apparatus may further comprise outstanding transaction checking circuitry configured to keep track of outstanding transactions being processed by the apparatus and to assert an outstanding transaction signal whilst there are outstanding transactions being processed, wherein performance of said power down is deferred whilst said outstanding transaction signal is asserted.

The outstanding transaction checking circuitry can be constructed in a variety of ways. However, in one embodiment the outstanding transaction checking circuitry comprises first outstanding transaction checking circuitry within said first endpoint circuitry and second outstanding transaction checking circuitry within said second endpoint circuitry. The first outstanding transaction checking circuitry is configured to determine that a transaction is no longer outstanding when all data transfers associated with that transaction have been handled by the first endpoint circuitry, and to assert a first outstanding transaction signal whilst there is at least one outstanding transaction being handled by the first endpoint circuitry. Similarly, the second outstanding transaction checking circuitry is configured to determine that a transaction is no longer outstanding when all data transfers associated with that transaction have been handled by the second endpoint circuitry, and to assert a second outstanding transaction signal whilst there is at least one outstanding transaction being handled by the second endpoint circuitry.

In such an embodiment, the outstanding forward credit signal and the fast outstanding transaction signal may be logically combined to produce a first active signal, and similarly the outstanding reverse credit signal and the second outstanding transaction signal may be logically combined to produce a second active signal. Performance of said power down is then deferred until both the first active signal and the second active signal have been de-asserted. This provides a particularly simple and effective mechanism for making sure that there are no outstanding transactions, and no credit information on the fly between the first and second endpoint circuitry, when power down is performed.

There are a number of ways in which the outstanding transaction checking circuitry can keep track of outstanding transactions, but in one embodiment each outstanding transaction has a unique transaction identifier which is associated with each data transfer of that outstanding transaction, and the outstanding transaction checking circuitry is configured to use the unique transaction identifier to keep track of outstanding transactions.

The forward and reverse credit use circuits can take a variety of forms. However, in one embodiment, the forward credit use circuitry is configured to maintain at least one forward credit counter value, and the forward credit checking circuitry is configured to determine with reference to said at least one forward credit counter value whether to assert said outstanding forward credit signal. Similarly, the reverse credit use circuitry is configured to maintain at least one reverse credit counter value, and the reverse credit checking circuitry is configured to determine with reference to said at least one reverse credit counter value whether to assert said outstanding reverse credit signal.

In one embodiment, the forward credit use circuitry is configured to maintain a single forward credit counter value which is initialised to a forward credit initial value, which is adjusted by a predetermined change value in a first direction when said forward packet transmitter outputs a forward data packet to said bidirectional communication circuitry, and which is adjusted by the predetermined change value in a second direction (opposite to said first direction) when said forward credit information is received from the forward packet receiver over said bidirectional communication circuitry. The forward credit checking circuitry is then configured to assert said outstanding forward credit signal whilst said single forward credit counter value does not equal said forward credit initial value. In one embodiment, the reverse credit use circuitry and reverse credit checking circuitry can be configured in an identical manner.

In an alternative embodiment, the forward credit use circuitry is configured to maintain a forward transmitter counter value, which is adjusted by a predetermined change value in a first direction when said forward packet transmitter outputs a forward data packet to said bidirectional communication circuitry, and is arranged to receive as said forward credit information a forward receiver counter value maintained by the forward packet receiver and adjusted by the predetermined change value in a second direction when a data packet is removed from said forward packet buffer circuit, the forward credit use circuitry further comprising comparison circuitry configured to perform a comparison of said forward transmitter counter value and said forward receiver counter value when determining whether to allow transmission of a forward data packet from the forward packet transmitter to the forward packet receiver, and the forward credit checking circuitry being configured to assert said outstanding forward credit signal whenever the output of the comparison circuitry indicates that said forward transmitter counter value and said forward receiver counter value are different. In one embodiment, the reverse credit use circuitry and reverse credit checking circuitry can be configured in an identical manner.

The approach of this alternative embodiment can be particularly beneficial in situations where the credit information is passing across an asynchronous clock boundary. In particular it provides flow control using a mechanism in which tokens are no longer passed across the asynchronous clock boundary consuming resource with their own buffer requirements, but instead each side of the asynchronous clock boundary keeps its own counter value with the counter value of the receiver being passed back to the transmitter. These counter values are compared and from this comparison a determination made as to whether or not there is available storage capacity within the buffer at the packet receiver and accordingly the data packet flow may be gated so as not to overflow this buffer. Should synchronisation issues across the asynchronous clock boundary have the effect than an out-of-date receiver counter value is present on the transmitter side, or that an intermediate receiver counter value between a previous receiver count value and a current receiver count value is missed, no damaging effect upon the operation of the system will arise since, provided that whatever receiver counter value is currently passed back to the transmitter side indicates that storage is available in the buffer at the receiver, then a safe transmission of a data packet may be made. If an out-of-date receiver counter value is currently held on the transmitter side, then this will be safe as the only difference that can arise from use of that out-of-date information is for that information to indicate that storage space within the buffer is not available (when in fact it is) and so a data packet will not be sent and there will be no data lost. Updated receiver counter values indicating that space is available within the buffer at the receiver are delayed rather than being sent too soon to the transmitter side and accordingly there is a reduced risk of data loss due to a data packet being sent when no storage capacity is available within the buffer at the receiver. In addition, the credit checking circuitry will continue to assert the outstanding credit signal whilst any up-to-date receiver counter value is in flight between the relevant receiver and transmitter, since only when there is no such counter value in flight will the transmitter counter value and the receiver counter value be the same.

While it is possible for the transmitter counter value and the receiver counter value to be managed in different ways, a simple and efficient way of implementing the above embodiment is when the transmitter counter value and the receiver counter value are changed in a common direction by the predetermined change value. The transmitter counter value can thus, for example, be incremented whenever a data packet is sent. The receiver counter value would in this case be incremented whenever a data packet was removed from the buffer. If the difference between the transmitter counter value and the receiver counter value as observed on the transmitter side exceeds a given threshold, then this indicates that the buffer is full and no more data packets should be sent at that time.

In one embodiment, the first endpoint circuitry operates under control of a first clock signal, the second endpoint circuitry operates under control of a second clock signal which is asynchronous from the first clock signal, and the bidirectional communication circuitry is configured to transfer the forward data packets and the reverse data packets across an asynchronous clock boundary between a first clock domain using the first clock signal and a second clock domain using the second clock signal.

In some embodiments the bidirectional communication circuitry which is disposed between these two clock domains may itself comprise a further clock domain, e.g. a communication circuitry clock domain that is separate from the first clock domain and the second clock domain. As the first clock domain and the second clock domain are asynchronous with each other, then there will be at least one asynchronous clock boundary which needs to be crossed between the first clock domain and the second clock domain irrespective of the presence of the communication circuitry clock domain therebetween. The communication circuitry clock domain could be synchronous with the first clock domain in which case there would be an asynchronous clock boundary between the communication circuitry clock domain and the second clock domain. Alternatively, it is possible that the communication circuitry clock domain could be synchronous with the second clock domain such that there is an asynchronous clock boundary between the first clock domain and the communication circuitry clock domain.

The separate provision of the communication circuitry clock domain allows the communication clock signal within this communication circuitry clock domain to be higher than the clock signals within the first clock domain or the second clock domain (e.g. an integer multiple thereof) to allow the communication circuits operating within the communication circuitry clock domain to achieve a data throughput sufficient to transfer the multiple data packets into which signals to be passed from the source side to the destination side are broken down, transmitted and reassembled.

Viewed from a second aspect, the present invention provides a method of providing a bidirectional communications link between a master device and a slave device, comprising: coupling first endpoint circuitry to the master device; coupling second endpoint circuitry to the slave device; employing bidirectional communication circuitry coupled to said first endpoint circuitry and said second endpoint circuitry to transfer forward data packets from the first endpoint circuitry to the second endpoint circuitry and to transfer reverse data packets from the second endpoint circuitry to the first endpoint circuitry; providing within the first endpoint circuitry a forward packet transmitter to generate said forward data packets and a reverse packet receiver to receive said reverse data packets into a reverse packet buffer circuit; providing within the second endpoint circuitry a reverse packet transmitter to generate said reverse data packets and a forward packet receiver to receive said forward data packets into a forward packet buffer circuit; using forward credit use circuitry to gate transmission of forward data packets from the forward packet transmitter to the forward packet receiver in dependence on forward credit information issued from the forward packet receiver over said bidirectional communication circuitry in response to forward data packets being removed from said forward packet buffer circuit; using forward credit checking circuitry to monitor a status of the forward credit use circuitry and to assert an outstanding forward credit signal if said status indicates that some forward credit information is outstanding from the forward packet receiver; using reverse credit use circuitry to gate transmission of reverse data packets from the reverse packet transmitter to the reverse packet receiver in dependence on reverse credit information issued from the reverse packet receiver over said bidirectional communication circuitry in response to reverse data packets being removed from said reverse packet buffer circuit; using reverse credit checking circuitry to monitor a status of the reverse credit use circuitry and to assert an outstanding reverse credit signal if said status indicates that some reverse credit information is outstanding from the reverse packet receiver; in response to a power down condition requiring a power down of at least one of the first endpoint circuitry and the second endpoint circuitry, deferring performance of said power down being until both said outstanding forward credit signal and said outstanding reverse credit signal have been de-asserted.

Viewed from a third aspect, the present invention provides an apparatus for providing a bidirectional communications link between a master device and a slave device, comprising: first endpoint means for coupling to the master device; second endpoint means for coupling to the slave device; bidirectional communication means for coupling to said first endpoint means and said second endpoint means and for transferring forward data packets from the first endpoint means to the second endpoint means and for transferring reverse data packets from the second endpoint means to the first endpoint means; the first endpoint means comprising a forward packet transmitter means for generating said forward data packets and a reverse packet receiver means for receiving said reverse data packets into a reverse packet buffer means; the second endpoint means comprising a reverse packet transmitter means for generating said reverse data packets and a forward packet receiver means for receiving said forward data packets into a forward packet buffer means; the first endpoint means further comprising forward credit use means for gating transmission of forward data packets from the forward packet transmitter means to the forward packet receiver means in dependence on forward credit information issued from the forward packet receiver means over said bidirectional communication means in response to forward data packets being removed from said forward packet buffer means, the first endpoint means further comprising forward credit checking means for monitoring a status of the forward credit use means and for asserting an outstanding forward credit signal if said status indicates that some forward credit information is outstanding from the forward packet receiver means; and the second endpoint means further comprising reverse credit use means for gating transmission of reverse data packets from the reverse packet transmitter means to the reverse packet receiver means in dependence on reverse credit information issued from the reverse packet receiver means over said bidirectional communication means in response to reverse data packets being removed from said reverse packet buffer means, the second endpoint means further comprising reverse credit checking means for monitoring a status of the reverse credit use means and for asserting an outstanding reverse credit signal if said status indicates that some reverse credit information is outstanding from the reverse packet receiver means; wherein in response to a power down condition requiring a power down of at least one of the first endpoint means and the second endpoint means, performance of said power down is deferred until both said outstanding forward credit signal and said outstanding reverse credit signal have been de-asserted.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
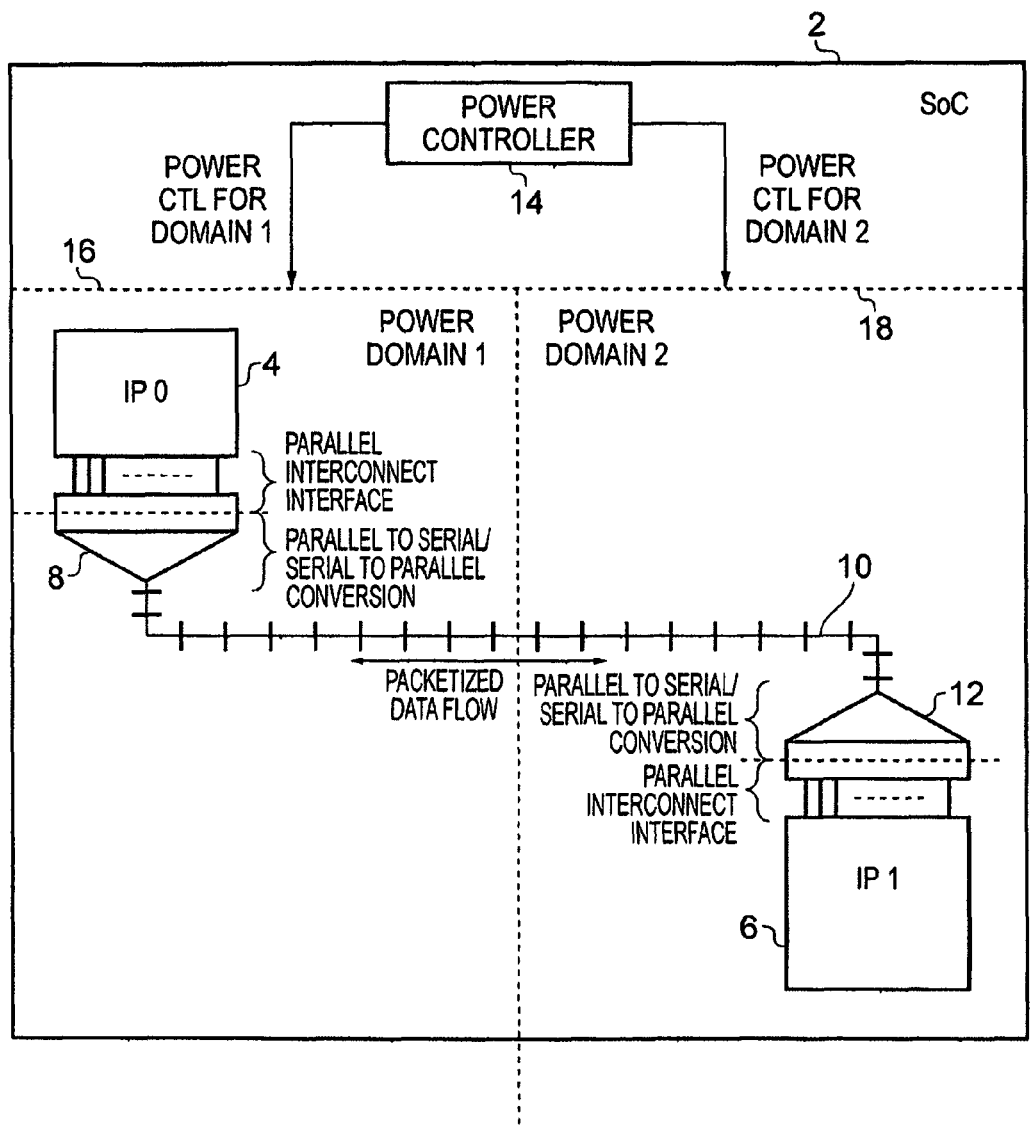
FIG. 1 schematically illustrates a System-on-Chip integrated circuit in which parallel interconnect signals are converted to data packets for transmission across a thin link interconnect structure, in accordance with one embodiment.

FIG. 1 schematically illustrates a System-on-Chip (SoC) integrated circuit 2 including a first functional block 4 and a second functional block 6 between which it is desired to pass signals. The first functional block 4 and the second functional block 6 can take a variety of forms, for example a processor core, a graphics processing unit, a memory controller, an input/output controller, etc. Such functional blocks 4, 6 are conventionally provided with a parallel interconnect interface, such as an AXI interface as designed by ARM Limited of Cambridge, England. Such a parallel interconnect interface is wide and may include several hundred bit line signals. In order to efficiently transfer the signals from this wide parallel interconnect interface across the SoC integrated circuit, the present technique uses parallel-to-serial conversion to convert the parallel interconnect interface signals into a plurality of data packets.

In particular, a thin link interconnect structure is provided between the first and second functional blocks, comprising first endpoint circuitry 8 associated with the first functional block 4, second endpoint circuitry 12 associated with the second functional block 6, and bidirectional communication circuitry 10 coupled to both the first and second endpoint circuits and configured to transfer forward data packets from the first endpoint circuitry 8 to the second endpoint circuitry 12 and to transfer reverse data packets from the second endpoint circuitry 12 to the first endpoint circuitry 8. The first endpoint circuitry 8 includes conversion and packet transmission circuitry to generate data packets from the signals presented at the wide parallel interconnect interface with the first functional block 4, those data packets being time-division multiplexed across the bidirectional communication circuitry 10 and then received at packet receiver circuitry within the second endpoint circuitry. The packet receiver circuitry then reassembles the parallel interconnect interface signals through a serial-to-parallel conversion, from whereafter they are provided to the second functional block 6. Similarly, the second endpoint circuitry 12 also includes conversion and packet transmission circuitry for generating data packets which are then time-division multiplexed across the bidirectional communication circuitry 10 and then received at packet receiver circuitry within the first endpoint circuitry 8.

It will be appreciated that the data packets sent across the bidirectional communication circuitry 10 may themselves be a plurality of bits wide. As an example, the data packets may be 8-bit parallel signals routed through 8 parallel bit lines. Multiple such data packets are transmitted in series to represent what may be hundreds of bit line signals which comprise the full interconnect parallel interface (e.g. an AXI interface).

Many modern SoC integrated circuits employ multiple power domains, allowing parts of the SoC to be powered down when not in use, in order to reduce power consumption. In the example of FIG. 1, it is assumed that the functional block 4 and associated first endpoint circuitry 8 reside within a first power domain 16, whilst the functional block 6 and associated second endpoint circuitry 12 reside in a second power domain 18. A power controller 14 is provided for controlling the power provided to both the first power domain 16 and the second power domain 18. In the example of FIG. 1, the power controller 14 is provided on-chip, but it will be appreciated that in alternative embodiments at least part of the power controller may be provided off-chip.

In one embodiment, different parts of the SoC 2 may operate from different clock signals, and hence in one embodiment the first functional block 4 and the second functional block 6 may reside in different clock domains, and indeed these clock domains may be asynchronous with respect to each other. The bidirectional communication circuitry 10 may also operate in a further clock domain at its own clock frequency, for example an integer multiple of the clock frequency used by either the first functional block 4 or the second functional block 6. In such an embodiment, an asynchronous clock boundary will exist somewhere between the first functional block/endpoint circuitry 4, 8 and the second functional block/endpoint circuitry 6, 12.

It will be appreciated that FIG. 1 illustrates only two functional blocks 4, 6 with a thin link interconnect between them for the transfer of data packets. It will however be appreciated by those skilled in the art that such a SoC integrated circuit 2 will typically comprise multiple functional blocks that may be coupled together by various thin link interconnect structures 8, 10, 12 to allow a variety of different connections to be made between those functional blocks. FIG. 1 has been simplified over this real-life situation for the sake of clarity.

Figure 2:
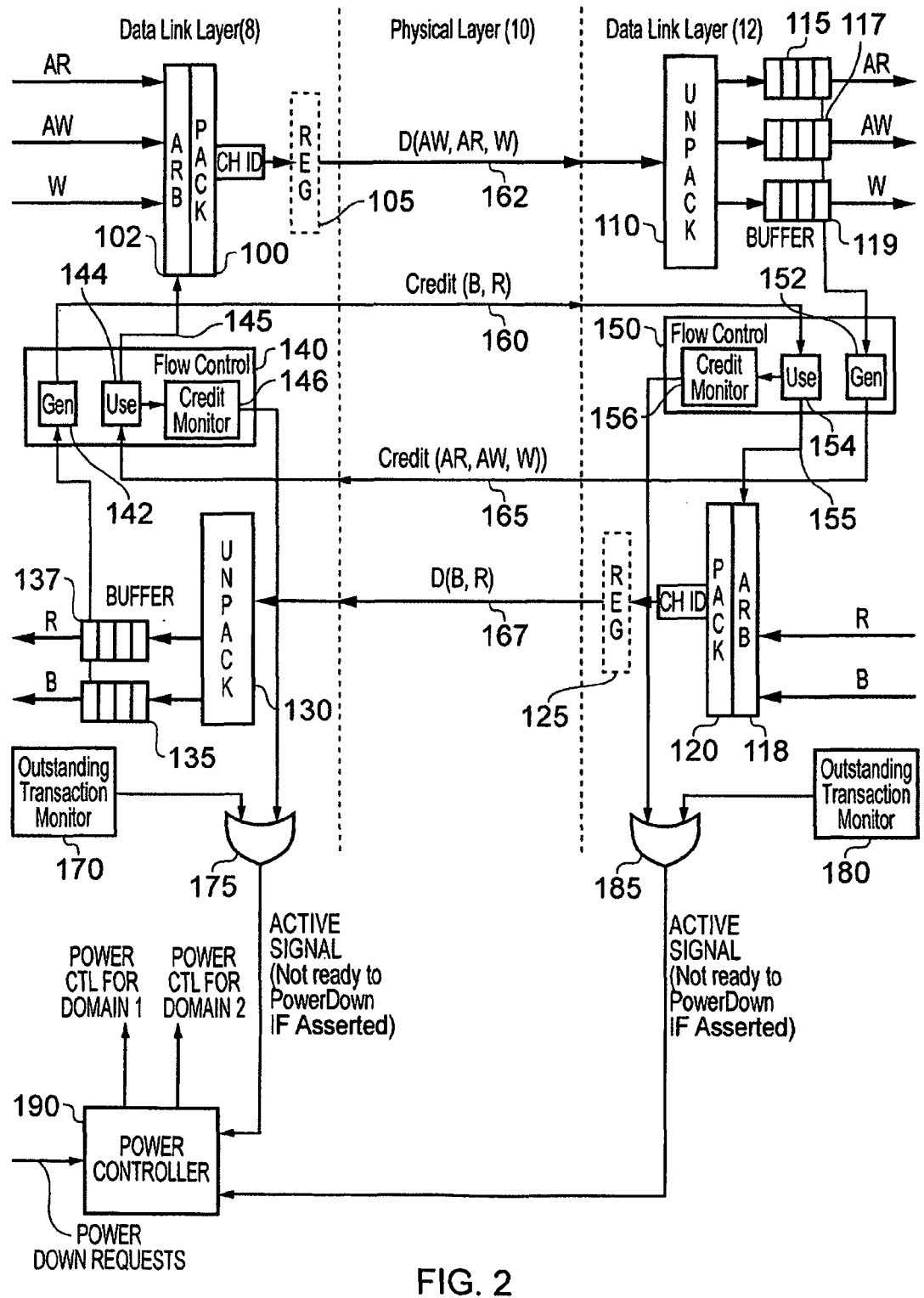
FIG. 2 is a block diagram illustrating in more detail components provided to form the thin link interconnect structure of FIG. 1 between first and second functional blocks, in accordance with one embodiment.

FIG. 2 illustrates in more detail components provided within the thin link interconnect structure 8, 10, 12 of FIG. 1 in accordance with one embodiment. Within the first power domain, the data from multiple data channels AR (read address), AW (write address) and W (write data) need to be sent from the functional block 4 to the functional block 6. In addition, in the reverse direction, the data from multiple data channels R (read data) and B (write response) need to be returned from the functional block 6 to the functional block 4. Furthermore, there may be multiple virtual channels layered over each of these physical channels. Thus, for example, the read address channel AR may be provided in multiple virtual channels each having an associated pair of a packet transmitter and a packet receiver within the data link layer 8 and the data link layer 12, respectively.

Considering the transmission of forward data packets from the first functional block 4 to the second functional block 6, an arbitration circuit 102 within the first endpoint circuitry 8 is arranged to arbitrate between multiple asserted transfer requests on the read address, write address and write data channels. Whichever transfer request is accepted by the arbitration circuitry 102 is then passed to the packing circuitry 100 and register 105. The wide parallel transfer accepted by the arbiter is then broken down into a plurality of narrower data packets, with an associated channel identifier (CHID) applied thereto, that are assembled within the register 105 before being passed across the data transmission path 162 of the physical layer 10 and received into the unpacking circuitry 110 within the data link layer 12. This unpacking circuitry 110 serves to reassemble the transfer signal and place this into an associated first-in-first-out (FIFO) buffer circuit 115, 117, 119. In particular, for a read address transfer, the buffer circuit 115 will be used, for a write address transfer, the buffer circuit 117 will be used, and for a write data transfer, the buffer circuit 119 will be used. Hence, whilst the packing circuitry 100 and the unpacking circuitry 110 may be shared between the different channels AR, AW and W, on the receiver side each of the separate channels (and each of the virtual channels if present) is provided with its own buffer circuitry 115, 117, 119 into which the parallel signals may be reassembled and resynchronised back to the receiver clock domain.

In the reverse direction from the second endpoint circuitry to the first endpoint circuitry, similar arbiter, packing, channel identification, register and unpacking circuits are provided together with associated buffer circuits into which the parallel interconnect signals are reassembled. Hence, the components 118, 120, 125, 130, 135 and 137 provided for the transmission of reverse data packets from the second endpoint circuitry 12 to the first endpoint circuitry 8 operate similarly to the corresponding components 102, 100, 105, 110 and 115 to 119 provided for the transmission of forward data packets from the first endpoint circuitry 8 to the second endpoint circuitry 12. However, since the data packets transferred over the data communication path 167 of the physical layer 10 will only relate to one of two different transfer types in the illustrated embodiment, namely a read data transfer and a write response transfer, only two buffer circuits 135, 137 are required.

Schematically illustrated in FIG. 2 is flow control circuitry 140, 150 provided to control flow in either direction. The flow control circuitry 140 serves, for each channel, to gate forward data packet flow from the first endpoint circuitry 8 to the second endpoint circuitry 12 dependent upon the availability of storage space within the respective buffer circuit 115, 117, 119 within the second endpoint circuitry. In order to do this, forward credit use circuitry 144 within the flow control circuitry 140 generates a credit signal over path 145 indicating whether the transmission of forward data packets over the transmission path 162 is allowed having regard to the space available within the buffers 115, 117, 119. To enable the forward credit use circuitry 144 to make this determination, forward credit information is returned over the path 165 from a forward credit information generation block 152 within the flow control circuitry 150 of the second endpoint circuitry 12. In particular, credit information is returned on a per channel basis identifying when data packets are removed from the associated buffer. Based on knowledge about the size of the buffers 115, 117, 119, the forward credit use circuitry 144 can then determine for each channel whether there is space in the relevant buffers to receive one or more data packets, and can then issue as the credit signal over path 145 a signal identifying how many packets, if any, can be transmitted for each channel. The arbitration circuitry 102 can then use this information when performing the arbitration operation.

Due to the fact that a bidirectional communication path is provided within the thin link interconnect structure for transfer of data packets, it will be appreciated that credit information is also flowing in both directions between the first endpoint circuitry 8 and the second endpoint circuitry 12. In particular, in addition to the forward credit information returned over path 165 and used to gate the transmission of forward data packets over the communication path 162, reverse credit information will also be returned over the path 160 from the first endpoint circuitry 8 to the second endpoint circuitry 12 in order to gate the transmission of reverse data packets over the transmission path 167. Hence, the reverse credit use circuitry 154 within the flow control circuitry 150 will use the reverse credit information returned over path 160 from the credit generation block 142 within the flow control circuitry 140 in order to generate a credit signal passed over path 155 to the arbiter 118.

The inventors of the present invention realised that a potential deadlock situation can arise when employing such a credit-based flow control mechanism to control transmission of data packets over the bidirectional communication link. In particular, if either or both of the first endpoint circuitry and the second endpoint circuitry are powered down following the transfer of any outstanding data packets, it is possible that credit information will be in the process of being transferred over the bidirectional communication circuitry via either path 160 or path 165 at the time that the power down is performed. In such a situation, any such credit information that is on-the-fly between a generation block 142, 152 and the associated use block 154, 144, respectively, will be lost. Due to the typical length of the bidirectional communication circuitry providing the physical layer 10, it often takes multiple clock cycles for signals to pass from one end to the other, hence increasing the likelihood that some credit information will be on-the-fly at the time the power down takes place.

Figure 3:
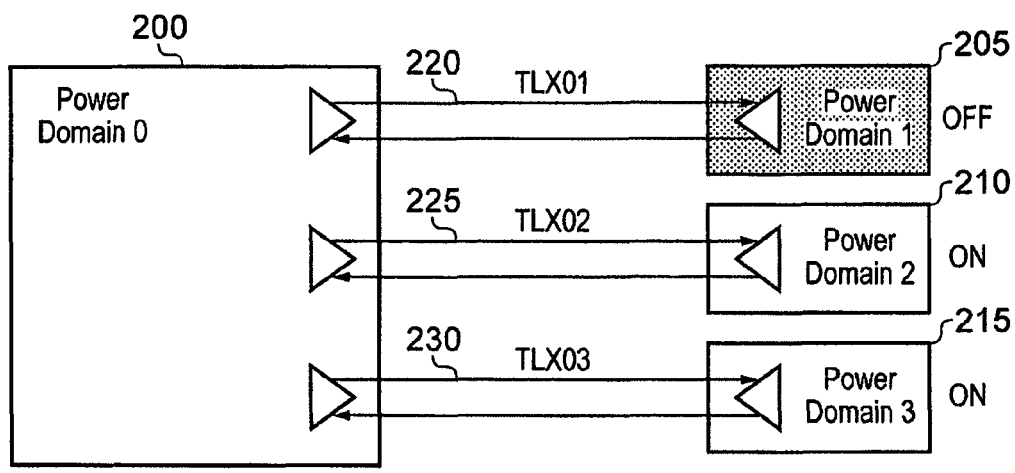
FIGS. 3, 4A and 4B schematically illustrate how credit information could be lost within the thin link interconnect structure during power down and power up operations, if the technique of the embodiments of the present invention is not used.
Figure 4A:
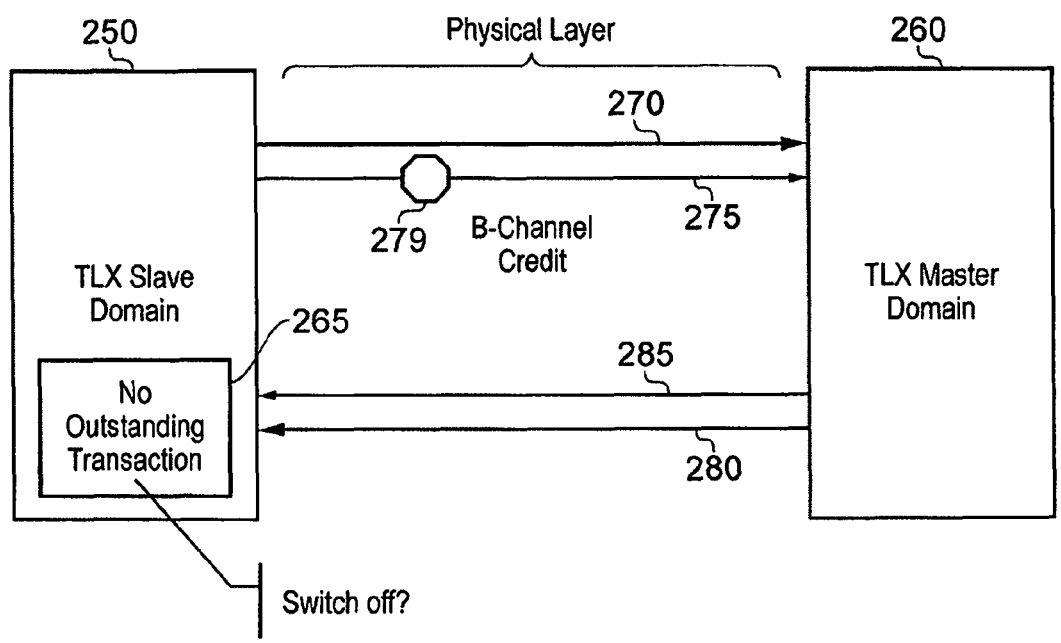
Figure 4B:
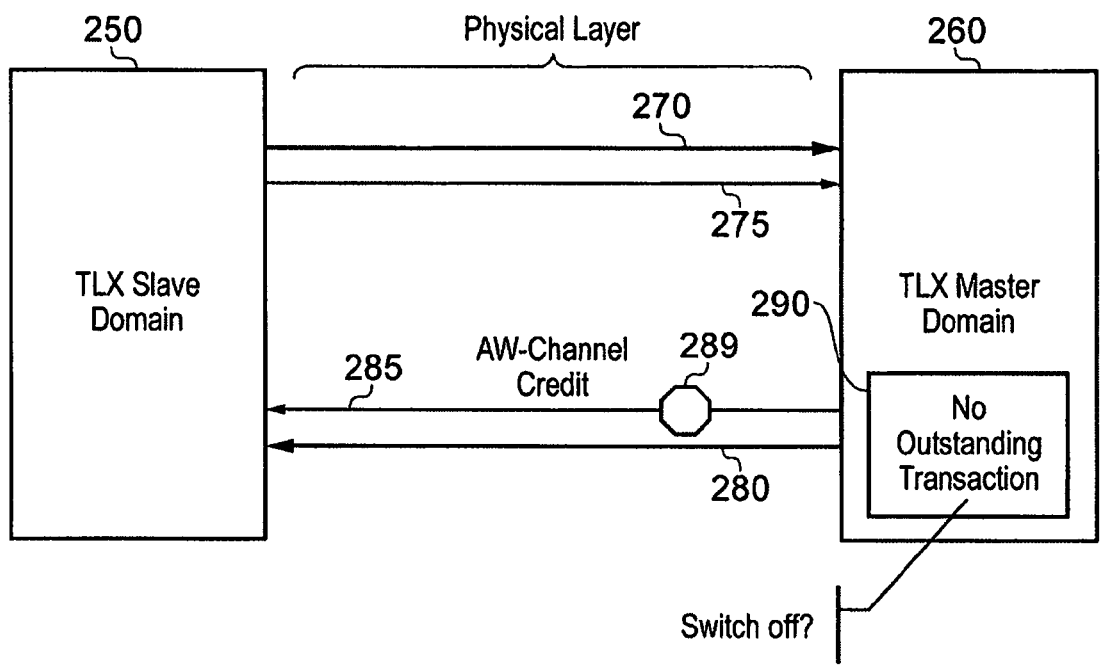

The problems associated with this potential loss of credit information are illustrated schematically with reference to FIGS. 3, 4A and 4B. In particular, FIG. 3 shows an example scenario where three thin link interconnect structures 220, 225, 230 are arranged to provide interconnections between components in various different power domains. Hence, the thin link interconnect structure 220 provides a connection between power domain 200 and power domain 205, the thin link interconnect structure 225 provides a link between the power domain 200 and the power domain 210, and the thin link interconnect structure 230 provides a link between the power domain 200 and the power domain 215. At some point, it may be necessary to power down the power domain 205. In FIG. 4A, the slave domain components 250 may reside within first endpoint circuitry of the thin link interconnect structure 220, and hence may reside within the power domain 200, whilst the master domain components 260 may reside within the second endpoint circuitry of that thin link interconnect structure 220, and hence reside within the power domain 205. Forward data packets are hence transmitted over the data communication path 270, with the associated forward credit information being returned over the path 285. Similarly, reverse data packets may be transmitted over the reverse communication path 280, with the reverse credit information then being returned over the path 275.

Following a request to power down the power domain 205, transaction checking circuitry 265 within the slave domain 250 may be arranged to check that there are no outstanding transactions still in progress, and hence for example will check transaction IDs for forward transfers received over the AR, AW and W channels against transaction IDs associated with the reverse transfers output over the R and B channels.

FIG. 4A illustrates a scenario where it is determined that there is no outstanding transaction data within the slave domain 250, but it turns out that there is associated outstanding reverse credit information 279 on-the-fly between the slave domain 250 and the master domain 260 over path 275. If the thin link interconnect structure is powered down based on the output from the outstanding transaction tracker 265, then these credits will be lost. During a subsequent power up operation, the packer circuitry 120 associated with the reverse link will run low on credits, and in the worst case there may be insufficient credit for the transmission of reverse data packets, at which point the thin link structure will enter a deadlock situation.

FIG. 4B illustrates the alternative scenario where the outstanding transaction checker 290 within the master domain 260 determines that there are no outstanding transactions within the master domain, but it turns out that there is still outstanding forward credit information 289 on-the-fly over path 285. Again, if the thin link is powered down based on the output of the outstanding transaction monitor 290, that credit information will be lost, and during a subsequent power up the packet transmitter 100 within the slave domain 250 will run low on credits, and in the worst case will have insufficient credit to transmit forward data packets, again giving rise to the deadlock situation.

Returning to FIG. 2, this problem is addressed through use of the credit monitor circuits 146, 156 within the flow control circuitry 140, 150. In particular, the forward credit checking monitor 146 monitors a status of the forward credit use circuitry 144, and asserts an outstanding forward credit signal if that status indicates that some forward credit information is outstanding (i.e. some forward credit information is awaited over path 165). Similarly, the reverse credit checking monitor 156 monitors a status of the reverse credit use circuitry 154 and asserts an outstanding reverse credit signal if that status indicates that some reverse credit information is outstanding, i.e. some reverse credit information is still awaited over path 160. The exact checks performed by the credit monitor will depend on how the associated use circuitry is constructed, and two particular examples will be discussed later with reference to FIGS. 7 and 8.

Outstanding transaction monitors 170, 180 are also provided for monitoring the various forward transfers and reverse transfers passing over the associated parallel interconnect interface, in order to determine whether there are any outstanding transactions still being handled by the associated endpoint circuitry. If it is determined that there are outstanding transactions being processed, then an outstanding transaction signal is asserted from the relevant transaction monitor 170, 180.

The signal from the outstanding transaction monitor 170 and the credit monitor 146 are passed through a logical OR circuit 175 in order to generate a first active signal, this first active signal being asserted if it is determined that there are any outstanding transactions being processed by the first endpoint circuitry and/or there is any outstanding forward credit information awaited by the first endpoint circuitry. If the first active signal is asserted, this indicates to the power controller 190 that the thin link circuitry is not ready to be powered down.

Similarly, the logical OR circuitry 185 combines the output of the outstanding transaction monitor 180 and the credit monitor 156 and generates a second active signal which is asserted if any outstanding transactions are being processed by the second endpoint circuitry and/or any reverse credit information is awaited over path 160. The power controller 190 then determines that the thin link circuitry is not ready to be powered down if the second active signal is asserted. Hence, the first and second active signals can be used by the power controller when deciding how to action any power down requests that it receives, and in particular the power down of either the first power domain or the second power domain will be deferred until both the first active signal and the second active signal are no longer asserted.

Figure 5:
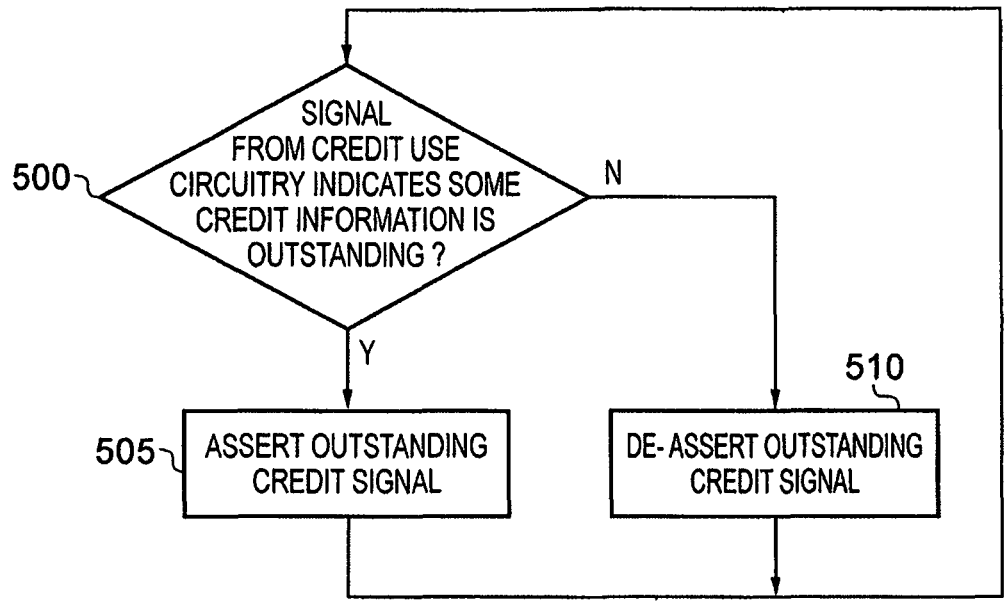
FIG. 5 is a flow diagram illustrating the operation of the credit monitors of FIG. 2 in accordance with one embodiment.

FIG. 5 is a flow diagram illustrating the operation of the credit monitor 146 or the credit monitor 156. At step 500, it is determined whether a status signal from the associated credit use circuitry indicates that some credit information is outstanding. If so, the outstanding credit signal is asserted at step 505, whereas otherwise the outstanding credit signal is de-asserted at step 510. The process then returns to step 500.

Figure 6:
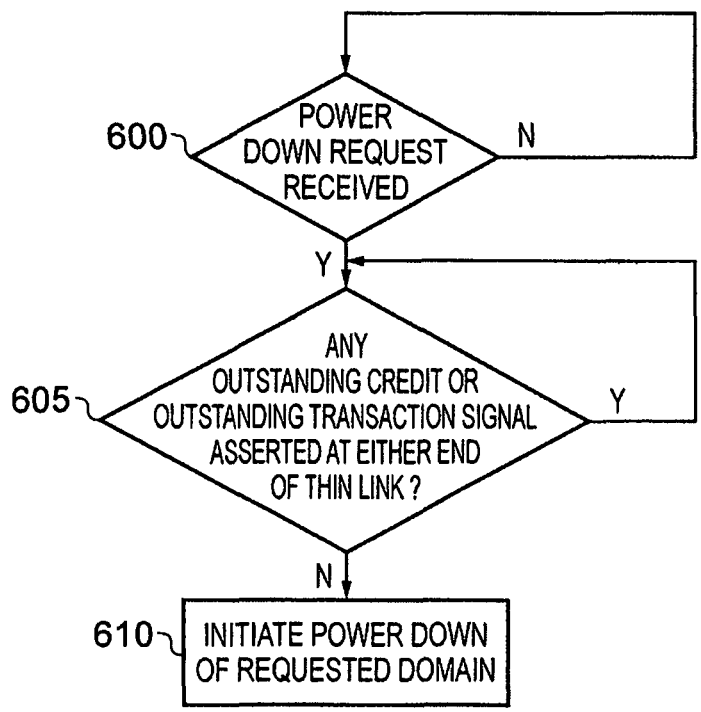
FIG. 6 is a flow diagram illustrating the operation of the power controller of FIG. 2 in accordance with one embodiment.

FIG. 6 is a flow diagram illustrating the operation of the power controller 190 in dependence on the first and second active signals. At step 600, it is determined whether a power down request has been received in relation to either or both of power domains 1 and 2. If so, it is determined at step 605 whether any outstanding credit signal or any outstanding transaction signal is asserted at either end of the thin link. From the earlier discussion of FIG. 2, it will be appreciated that this will be the case if either the first active signal or the second active signal is asserted. If there are any outstanding credit or transaction signals that are still asserted, then the process remains at step 605 until all such signals have been de-asserted, and accordingly both the first and second active signals are de-asserted. Thereafter, the process proceeds to step 610 where the power down of the requested domain(s) is initiated.

Figure 7:
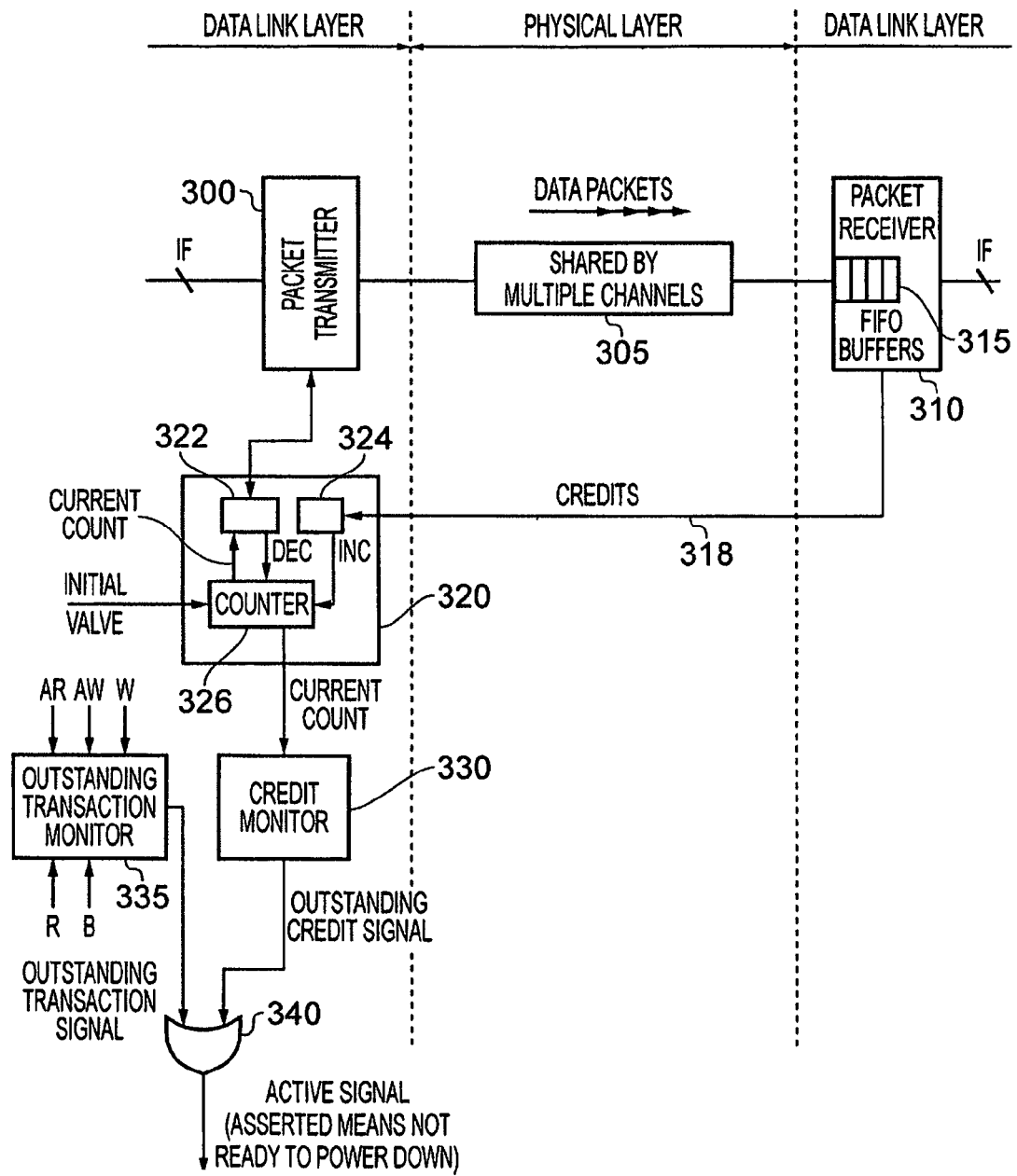
FIG. 7 schematically illustrates components used in one embodiment to handle transfer of forward data packets through the thin link interconnect structure.

FIG. 7 illustrates one arrangement of credit use circuitry and associated credit monitor circuitry that can be used in accordance with one embodiment. For simplicity, only that circuitry associated with the transmission of forward data packets from the first endpoint circuitry to the second endpoint circuitry is shown, but from the earlier discussions of FIG. 2 it will be appreciated that this circuitry can effectively be replicated in the other direction to provide for the transmission of reverse data packets from the second endpoint circuitry to the first endpoint circuitry. The packet transmitter 300 incorporating elements 100, 102 and 105 of FIG. 2 is connected to the multi-channel parallel interconnect interface, and converts the data transfers received on each channel into a sequence of data packets that are transferred over bidirectional communication circuitry 305 of the physical layer, that circuitry being shared between the multiple channels. As discussed earlier with reference to FIG. 2, the packet receiver 310 incorporating the unpacking circuitry 110 of FIG. 2 reassembles the packets constituting the various transfers and places that data in the respective FIFO buffers 315 (incorporating the buffers 115, 117 and 119 of FIG. 2).

Each time a data packet associated with a particular channel is removed from one of the buffers, a credit is returned through the physical layer over path 318, this credit information being received by the forward credit use circuitry 320. The forward credit use circuitry 320 maintains for each channel a counter 326 which is initialised to an initial value, for example a predetermined maximum value dictated by the size of the associated FIFO buffer. When the packet transmitter 300 wishes to transfer one or more data packets relating to a particular communication channel, it will only do so if the credit signal it receives from the forward credit use circuitry 320 indicates that there is enough space within the relevant FIFO buffer 315 at the packet receiver 310. In particular, the packet transmitter interface circuitry 322 will monitor the current counter value for each channel, and based on that information can send a per channel credit signal to the packet transmitter 300 identifying the number of packets that can be sent for each channel. Based on this information, whenever the packet transmitter 300 transmits a packet for a particular channel, it notifies the interface circuitry 322 which then decrements the relevant counter by some predetermined amount for each packet transmitted.

Similarly, the circuitry 324 will increment the relevant counter each time it receives a credit for a particular channel over path 318. Accordingly, it will be seen that once the counter 326 for a particular channel drops to a specified minimum value, for example zero, this will indicate that the associated FIFO buffer is full, or at least if it is not full the relevant credits have not yet made their way back over path 318 to cause the counter to be incremented. Accordingly, at this point, the packet transmitter interface circuitry 322 will identify to the packet transmitter that no packets can be sent for the affected channel.

The credit monitor 330 is arranged to monitor the current counter values of each of the counters 326, and whenever the value of at least one of the counters is not equal to the initial value set in that counter, it will assert the outstanding credit signal, since this will mean that at least one credit item is awaited over path 318 from the packet receiver.

The outstanding transaction monitor 335 operates in a standard manner to monitor the transactions being handled through the first endpoint circuitry. Typically each pending transaction will have a unique transaction identifier, and this enables the outstanding transaction monitor to match up the forward transfers of a particular transaction passing from the first endpoint circuitry to the second endpoint circuitry with the returning transfers of that transaction from the second endpoint circuitry to the first endpoint circuitry. Whilst any transactions are pending, the outstanding transaction monitor asserts the outstanding transaction signal.

The OR gate 340 logically combines the outstanding credit signal and the outstanding transaction signal, and accordingly it will be seen that the active signal output by the OR gate will be asserted whenever one or both of the outstanding credit signal and the outstanding transaction signal are asserted.

Figure 8:
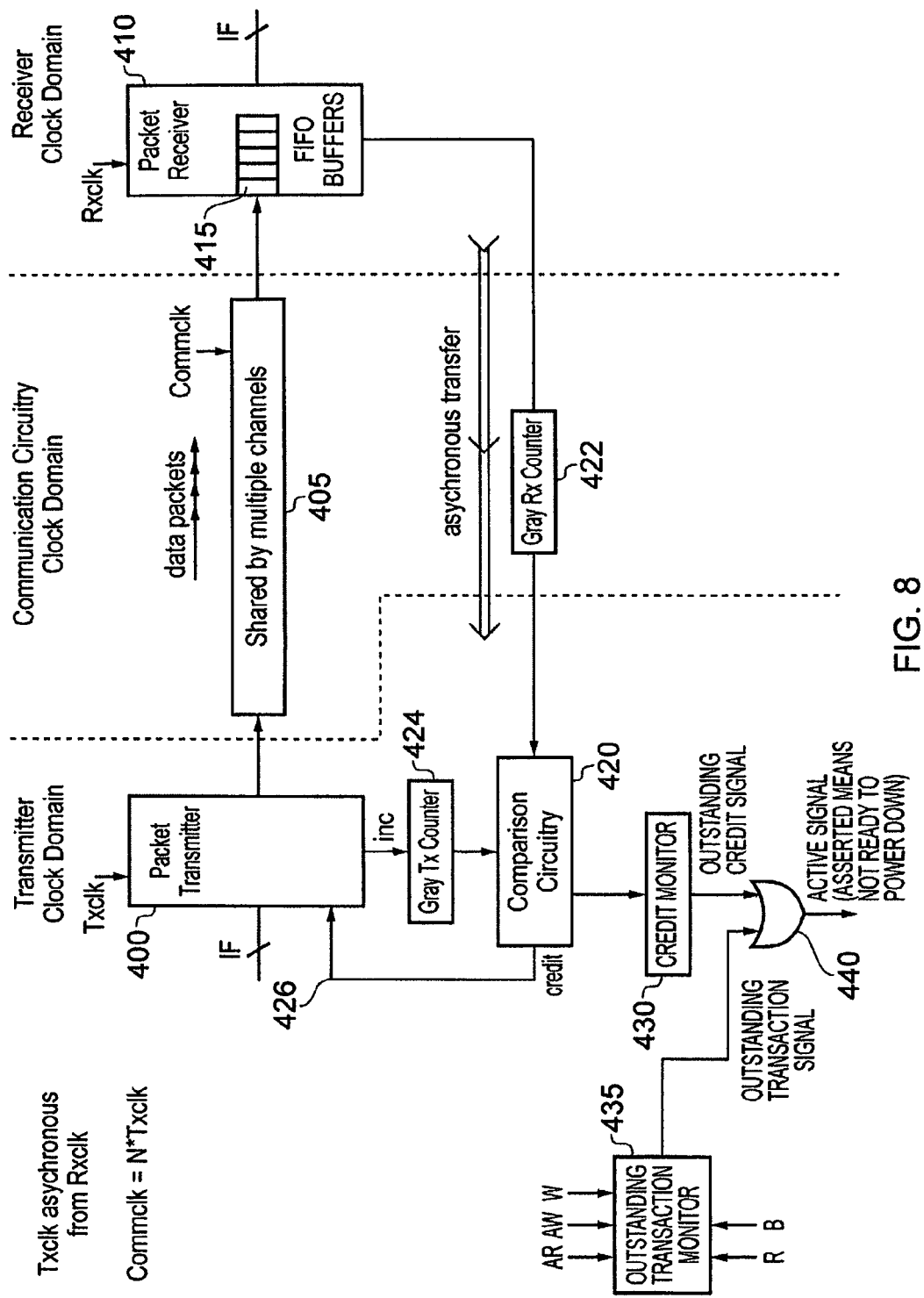
FIG. 8 schematically illustrates components used in an alternative embodiment to handle transfer of forward data packets through the thin link interconnect structure.

As mentioned earlier, the first and second endpoint circuits may operate in different clock domains, with clock signals that are asynchronous with respect to each other. Further, the bidirectional communication circuitry forming the physical layer may operate in its own clock domain. FIG. 8 illustrates an alternative arrangement that can be used in one embodiment in place of the circuitry illustrated in FIG. 7, which provides a particularly efficient mechanism for returning the credit information from the packet receiver. In this embodiment, the elements 400, 405, 410 and 415 correspond with the elements 300, 305, 310 and 315 of FIG. 7. The packet transmitter generates data packets under control of a transmitter clock within a transmitter clock domain. The packet receiver 410 similarly receives data packets into the first-in-first-out buffers 415 under control of a receiver clock signal within the receiver clock domain. The bidirectional communication circuitry includes circuitry 405 operating within a communication circuitry clock domain to transfer the data packets from the packet transmitter 400 to the packet receiver 410 when storage capacity is available within the buffer circuitry 415. The communication circuitry clock domain operates under control of a communication circuitry clock that is synchronous with, and has a frequency that is an integer multiple of, the transmitter clock.

Within the transmitter clock domain, a transmitter counter 424 is provided which is coupled to the packet transmitter 400. The transmitter counter 424 changes its count value by a predetermined change value (for example an increment of 1) when the packet transmitter outputs a data packet to the bidirectional communication circuitry. A receiver counter 422 is also provided which operates outside of the transmitter clock domain (in this case within the communication circuitry clock domain) and serves to change its receiver counter value by the predetermined change value when a data packet is removed from the associated buffer circuitry 415. In the illustrated embodiment, the transmitter counter 424 and the receiver counter 422 are both Gray counters in which the predetermined change value applied is an increment of 1. The comparison circuitry 420 forms the forward credit use circuitry and serves to receive the transmitter count value and the receiver count value, and to generate a credit signal over path 426 in response thereto. The credit signal is applied to the packet transmitter 400 and serves to gate whether or not the packet transmitter sends a data packet in dependence upon whether or not the comparison of the count values indicates that storage space is available within the buffer circuitry 415.

It will be appreciated that different portions of the thin link interconnect operate within different clock domains. The portion of the communication circuitry 405 which transfers the data packets operates within the communication circuitry clock domain. The receiver counter 422 similarly operates, in this example, within the communication circuitry clock domain. The comparison circuitry 420 and the transmitter counter 424 operate within the transmitter clock domain in this example embodiment. Further, in this example embodiment, the communication circuitry clock is synchronous with an integer multiple of the transmitter clock, and the transmitter clock is asynchronous with the receiver clock. Accordingly, there is an asynchronous clock boundary between the receiver clock domain and the communication circuitry clock domain.

Assuming the Gray counters 424, 422 are initialised to the same value, for example zero, when the integrated circuit is reset, then the comparison circuitry 420 can issue the credit signal dependent on the difference between the two counters. In one embodiment, separate transmit and receive counters will be kept for each channel. A synchronisation circuit within the comparison circuitry 420 can be used to synchronise the receiver count value with the transmitter clock domain. Thereafter, the comparison circuitry can be arranged to detect, for each channel, whether or not the difference between the transmitter counter value and the receiver counter value exceeds a predetermined threshold indicating that the associated buffer circuitry 415 is full. If the threshold is exceeded, then the credit signal serves to inhibit further data packet transmission by the packet transmitter 400 for the relevant channel. If this threshold is not exceeded, then such further packet transmission is permitted.

More details of the arrangement of the comparison circuitry 420, Gray counter 424 and Gray counter 422 is provided in commonly owned, co-pending U.S. patent application Ser. No. 13/424,778, the entire contents of which are hereby incorporated by reference. This approach provides flow control using a mechanism in which tokens are no longer passed across the asynchronous clock boundary consuming resource with their own buffer requirements, but instead each side of the asynchronous clock boundary keeps its own counter value with the counter value of the receiver being passed back to the transmitter. This system can still operate effectively even if synchronisation issues cause an out-of-date receiver counter value to be present on the transmitter side, or for an intermediate receiver counter value to be missed, since provided that whatever receiver counter value is currently passed back to the transmitter side indicates that storage is available in the buffer at the receiver, then a safe transmission of a data packet may be made.

In accordance with the embodiment of FIG. 8, the credit monitor 430 is arranged to monitor the state of the comparison circuitry 420. In particular, if the comparison circuitry indicates that the transmitter counter 424 and the receiver counter 422 have the same value, then this indicates that there is no outstanding credit awaited for the relevant channel. Accordingly, this means that not only is the associated FIFO buffer for that channel empty, but that all of the credit has been returned over the physical link by virtue of the receiver counter 422 correctly reflecting all of the credits issued to the packet transmitter for that channel. If for all of the channels the comparison circuitry indicates that the transmitter counter value and receiver counter value are the same, then this means that there is no outstanding credit associated with the forward transmission path, and accordingly the outstanding credit signal can be de-asserted. However, unless this is the condition, i.e. wherever at least one of the transmitter counter/receiver counter pairs do not match, then the outstanding credit signal will be asserted by the credit monitor 430.

The outstanding transaction monitor 435 operates in the same manner as the outstanding transaction monitor 335 of FIG. 7, and the OR gate 440 performs the same function as the OR gate 340 of FIG. 7. Accordingly, it will be seen that whenever the OR gate 440 asserts an active signal, this will mean that there is at least one outstanding transaction or at least one outstanding credit awaited in respect of the forward transmission path.

Through use of the above described embodiments, potential deadlock situations can be avoided that could otherwise arise when employing credit-based flow control mechanisms to control transmission of data packets over a bidirectional communication link. In particular, the technique ensures that no credit information will be on-the-fly between the two endpoint circuits at the time power down is performed, since all of the credit information accumulates back at the associated packet transmitter side of the bidirectional communication circuitry before the power down takes place. This accumulation of the credit information also alleviates a potential wakeup latency problem, since as soon as power up subsequently takes place, each packet transmitter has its full complement of credit, and can accordingly begin transmitting data packets without delay.

Although particular embodiments have been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

We claim:

1. An apparatus for providing a bidirectional communications link between a master device and a slave device, comprising:
first endpoint circuitry configured to be coupled to the master device;
second endpoint circuitry configured to be coupled to the slave device;
bidirectional communication circuitry coupled to said first endpoint circuitry and said second endpoint circuitry and configured to transfer forward data packets from the first endpoint circuitry to the second endpoint circuitry and to transfer reverse data packets from the second endpoint circuitry to the first endpoint circuitry;
the first endpoint circuitry comprising a forward packet transmitter configured to generate said forward data packets and a reverse packet receiver configured to receive said reverse data packets into a reverse packet buffer circuit;
the second endpoint circuitry comprising a reverse packet transmitter configured to generate said reverse data packets and a forward packet receiver configured to receive said forward data packets into a forward packet buffer circuit;
the first endpoint circuitry further comprising forward credit use circuitry configured to gate transmission of forward data packets from the forward packet transmitter to the forward packet receiver in dependence on forward credit information issued from the forward packet receiver over said bidirectional communication circuitry in response to forward data packets being removed from said forward packet buffer circuit, the first endpoint circuitry further comprising forward credit checking circuitry configured to monitor a status of the forward credit use circuitry and to assert an outstanding forward credit signal if said status indicates that some forward credit information is outstanding from the forward packet receiver; and
the second endpoint circuitry further comprising reverse credit use circuitry configured to gate transmission of reverse data packets from the reverse packet transmitter to the reverse packet receiver in dependence on reverse credit information issued from the reverse packet receiver over said bidirectional communication circuitry in response to reverse data packets being removed from said reverse packet buffer circuit, the second endpoint circuitry further comprising reverse credit checking circuitry configured to monitor a status of the reverse credit use circuitry and to assert an outstanding reverse credit signal if said status indicates that some reverse credit information is outstanding from the reverse packet receiver;
wherein in response to a power down condition requiring a power down of at least one of the first endpoint circuitry and the second endpoint circuitry, performance of said power down is deferred until both said outstanding forward credit signal and said outstanding reverse credit signal have been de-asserted.

2. An apparatus as claimed in claim 1, wherein said first endpoint circuitry resides in a first power domain, and said second endpoint circuitry resides in a second power domain, and the power control condition requires a power down of one of said first and second power domains.

3. An apparatus as claimed in claim 1, wherein said forward packet transmitter and said reverse packet transmitter are coupled to associated integrated circuit interconnect parallel interfaces and are configured to convert parallel signals received from the associated integrated circuit interconnect parallel interface to data packets for transmission via said bidirectional communication circuitry.

4. An apparatus as claimed in claim 1, wherein the master device is configured to initiate transactions, each transaction requiring a plurality of data transfers to take place between the master device and the slave device, including at least one forward data transfer from the master device to the slave device and at least one reverse data transfer from the slave device to the master device, the forward packet transmitter converting each forward data transfer into one or more forward data packets, and the reverse packet transmitter converting each reverse data transfer into one or more reverse data packets, and the apparatus further comprises:

outstanding transaction checking circuitry configured to keep track of outstanding transactions being processed by the apparatus and to assert an outstanding transaction signal whilst there are outstanding transactions being processed;

wherein performance of said power down is deferred whilst said outstanding transaction signal is asserted.

5. An apparatus as claimed in claim 1, wherein:
the forward credit use circuitry is configured to maintain at least one forward credit counter value, and the forward credit checking circuitry is configured to determine with reference to said at least one forward credit counter value whether to assert said outstanding forward credit signal;
the reverse credit use circuitry is configured to maintain at least one reverse credit counter value, and the reverse credit checking circuitry is configured to determine with reference to said at least one reverse credit counter value whether to assert said outstanding reverse credit signal.

6. An apparatus as claimed in claim 1, wherein:
said first endpoint circuitry operates under control of a first clock signal;
said second endpoint circuitry operates under control of a second clock signal which is asynchronous from said first clock signal; and
the bidirectional communication circuitry is configured to transfer the forward data packets and the reverse data packets across an asynchronous clock boundary between a first clock domain using the first clock signal and a second clock domain using the second clock signal.

7. An apparatus as claimed in claim 1, wherein said first endpoint circuitry and said second endpoint circuitry are disposed within a common integrated circuit.

8. An apparatus as claimed in claim 3, wherein said forward packet receiver and said reverse packet receiver are coupled to the associated integrated circuit interconnect parallel interfaces and are configured to convert data packets received from said bidirectional communication circuitry to parallel signals for transmission to the associated integrated circuit interconnect parallel interface.

9. An apparatus as claimed in claim 4, wherein:
the outstanding transaction checking circuitry comprises first outstanding transaction checking circuitry within said first endpoint circuitry and second outstanding transaction checking circuitry within said second endpoint circuitry;
the first outstanding transaction checking circuitry being configured to determine that a transaction is no longer outstanding when all data transfers associated with that transaction have been handled by the first endpoint circuitry, and to assert a first outstanding transaction signal whilst there is at least one outstanding transaction being handled by the first endpoint circuitry;
the second outstanding transaction checking circuitry being configured to determine that a transaction is no longer outstanding when all data transfers associated with that transaction have been handled by the second endpoint circuitry, and to assert a second outstanding transaction signal whilst there is at least one outstanding transaction being handled by the second endpoint circuitry.

10. An apparatus as claimed in claim 4, wherein each outstanding transaction has a unique transaction identifier which is associated with each data transfer of that outstanding transaction, the outstanding transaction checking circuitry being configured to use the unique transaction identifier to keep track of outstanding transactions.

11. An apparatus as claimed in claim 5, wherein:
the forward credit use circuitry is configured to maintain a single forward credit counter value which is initialised to a forward credit initial value, which is adjusted by a predetermined change value in a first direction when said forward packet transmitter outputs a forward data packet to said bidirectional communication circuitry, and which is adjusted by the predetermined change value in a second direction when said forward credit information is received from the forward packet receiver over said bidirectional communication circuitry, and the forward credit checking circuitry is configured to assert said outstanding forward credit signal whilst said single forward credit counter value does not equal said forward credit initial value.

12. An apparatus as claimed in claim 5, wherein:
the reverse credit use circuitry is configured to maintain a single reverse credit counter value which is initialised to a reverse credit initial value, which is adjusted by a predetermined change value in a first direction when said reverse packet transmitter outputs a reverse data packet to said bidirectional communication circuitry, and which is adjusted by the predetermined change value in a second direction when said reverse credit information is received from the reverse packet receiver over said bidirectional communication circuitry, and the reverse credit checking circuitry is configured to assert said outstanding reverse credit signal whilst said single reverse credit counter value does not equal said reverse credit initial value.

13. An apparatus as claimed in claim 5, wherein:
the forward credit use circuitry is configured to maintain a forward transmitter counter value, which is adjusted by a predetermined change value in a first direction when said forward packet transmitter outputs a forward data packet to said bidirectional communication circuitry, and is arranged to receive as said forward credit information a forward receiver counter value maintained by the forward packet receiver and adjusted by the predetermined change value in a second direction when a data packet is removed from said forward packet buffer circuit, the forward credit use circuitry further comprising comparison circuitry configured to perform a comparison of said forward transmitter counter value and said forward receiver counter value when determining whether to allow transmission of a forward data packet from the forward packet transmitter to the forward packet receiver, and the forward credit checking circuitry being configured to assert said outstanding forward credit signal whenever the output of the comparison circuitry indicates that said forward transmitter counter value and said forward receiver counter value are different.

14. An apparatus as claimed in claim 5, wherein:
the reverse credit use circuitry is configured to maintain a reverse transmitter counter value, which is adjusted by a predetermined change value in a first direction when said reverse packet transmitter outputs a reverse data packet to said bidirectional communication circuitry, and is arranged to receive as said reverse credit information a reverse receiver counter value maintained by the reverse packet receiver and adjusted by the predetermined change value in a second direction when a data packet is removed from said reverse packet buffer circuit, the reverse credit use circuitry further comprising comparison circuitry configured to perform a comparison of said reverse transmitter counter value and said reverse receiver counter value when determining whether to allow transmission of a reverse data packet from the reverse packet transmitter to the reverse packet receiver, and the reverse credit checking circuitry being configured to assert said outstanding reverse credit signal whenever the output of the comparison circuitry indicates that said reverse transmitter counter value and said reverse receiver counter value are different.

15. An apparatus as claimed in claim 6, wherein at least some portions of said bidirectional communication circuitry operate within a communication circuitry clock domain separate from said first clock domain and said second clock domain to transfer said forward data packets and reverse data packets under control of a communication clock signal, and said communication clock signal is an integer multiple of and synchronous with one of said first clock signal and said second clock signal.

16. An apparatus as claimed in claim 9, wherein said outstanding forward credit signal and said first outstanding transaction signal are logically combined to produce a first active signal, and said outstanding reverse credit signal and said second outstanding transaction signal are logically combined to produce a second active signal, and performance of said power down is deferred until both the first active signal and the second active signal have been de-asserted.

17. An apparatus as claimed in claim 13, wherein said forward transmitter counter value and said forward receiver counter value are changed in a common direction by said predetermined change value.

18. An apparatus as claimed in claim 14, wherein said reverse transmitter counter value and said reverse receiver counter value are changed in a common direction by said predetermined change value.

19. A method of providing a bidirectional communications link between a master device and a slave device, comprising:
coupling first endpoint circuitry to the master device;
coupling second endpoint circuitry to the slave device;
employing bidirectional communication circuitry coupled to said first endpoint circuitry and said second endpoint circuitry to transfer forward data packets from the first endpoint circuitry to the second endpoint circuitry and to transfer reverse data packets from the second endpoint circuitry to the first endpoint circuitry;
providing within the first endpoint circuitry a forward packet transmitter to generate said forward data packets and a reverse packet receiver to receive said reverse data packets into a reverse packet buffer circuit;
providing within the second endpoint circuitry a reverse packet transmitter to generate said reverse data packets and a forward packet receiver to receive said forward data packets into a forward packet buffer circuit;
using forward credit use circuitry to gate transmission of forward data packets from the forward packet transmitter to the forward packet receiver in dependence on forward credit information issued from the forward packet receiver over said bidirectional communication circuitry in response to forward data packets being removed from said forward packet buffer circuit;
using forward credit checking circuitry to monitor a status of the forward credit use circuitry and to assert an outstanding forward credit signal if said status indicates that some forward credit information is outstanding from the forward packet receiver;
using reverse credit use circuitry to gate transmission of reverse data packets from the reverse packet transmitter to the reverse packet receiver in dependence on reverse credit information issued from the reverse packet receiver over said bidirectional communication circuitry in response to reverse data packets being removed from said reverse packet buffer circuit;
using reverse credit checking circuitry to monitor a status of the reverse credit use circuitry and to assert an outstanding reverse credit signal if said status indicates that some reverse credit information is outstanding from the reverse packet receiver;
in response to a power down condition requiring a power down of at least one of the first endpoint circuitry and the second endpoint circuitry, deferring performance of said power down being until both said outstanding forward credit signal and said outstanding reverse credit signal have been de-asserted.

20. An apparatus for providing a bidirectional communications link between a master device and a slave device, comprising:
first endpoint means for coupling to the master device;
second endpoint means for coupling to the slave device;
bidirectional communication means for coupling to said first endpoint means and said second endpoint means and for transferring forward data packets from the first endpoint means to the second endpoint means and for transferring reverse data packets from the second endpoint means to the first endpoint means;
the first endpoint means comprising a forward packet transmitter means for generating said forward data packets and a reverse packet receiver means for receiving said reverse data packets into a reverse packet buffer means;
the second endpoint means comprising a reverse packet transmitter means for generating said reverse data packets and a forward packet receiver means for receiving said forward data packets into a forward packet buffer means;
the first endpoint means further comprising forward credit use means for gating transmission of forward data packets from the forward packet transmitter means to the forward packet receiver means in dependence on forward credit information issued from the forward packet receiver means over said bidirectional communication means in response to forward data packets being removed from said forward packet buffer means, the first endpoint means further comprising forward credit checking means for monitoring a status of the forward credit use means and for asserting an outstanding forward credit signal if said status indicates that some forward credit information is outstanding from the forward packet receiver means; and
the second endpoint means further comprising reverse credit use means for gating transmission of reverse data packets from the reverse packet transmitter means to the reverse packet receiver means in dependence on reverse credit information issued from the reverse packet receiver means over said bidirectional communication means in response to reverse data packets being removed from said reverse packet buffer means, the second endpoint means further comprising reverse credit checking means for monitoring a status of the reverse credit use means and for asserting an outstanding reverse credit signal if said status indicates that some reverse credit information is outstanding from the reverse packet receiver means;
wherein in response to a power down condition requiring a power down of at least one of the first endpoint means and the second endpoint means, performance of said power down is deferred until both said outstanding forward credit signal and said outstanding reverse credit signal have been de-asserted.

\* \* \* \* \*